United States Patent [19]
Ferguson et al.

[11] Patent Number: 5,122,212
[45] Date of Patent: Jun. 16, 1992

[54] METHOD AND APPARATUS FOR THE MANUFACTURE OF PRINTED AND EMBOSSED FLOOR COVERING

[75] Inventors: Donald C. Ferguson, Cranbury; Victor D. Mollis, Jr., Robbinsville, both of N.J.

[73] Assignee: American Biltrite, Inc., Lawrenceville, N.J.

[21] Appl. No.: 428,262

[22] Filed: Oct. 27, 1989

[51] Int. Cl.$^5$ .................. B32B 31/18; B32B 31/22
[52] U.S. Cl. .................. 156/209; 156/220; 156/231; 156/235; 156/238; 156/240; 156/244.24; 156/244.27; 156/269; 156/277; 156/384; 156/500; 156/501; 156/510; 156/540; 156/543; 156/553
[58] Field of Search .................. 156/85, 209, 220, 235, 156/238, 239, 240, 269, 277, 384, 510, 540, 543, 244.24, 324, 501, 244.27, 231, 553, 583.5, 500; 425/214

[56] References Cited

U.S. PATENT DOCUMENTS

| | | | |
|---|---|---|---|
| 3,767,510 | 10/1973 | Gustafon | 156/324 |
| 4,225,374 | 9/1980 | Kaufmann | 156/220 |
| 4,312,686 | 1/1982 | Smith et al. | 156/209 |
| 4,405,400 | 9/1983 | Petersen-Hoj | 156/244.24 |
| 4,612,074 | 9/1986 | Smith et al. | 156/85 |
| 4,678,528 | 7/1987 | Smith et al. | 156/220 |
| 4,773,959 | 9/1988 | Smith et al. | 156/351 |

Primary Examiner—Geoffrey L. Knable
Assistant Examiner—Michele K. Yoder
Attorney, Agent, or Firm—Pennie & Edmonds

[57] ABSTRACT

An improved process and means are disclosed for continuously forming tiles that are embossed in register with a printed design. In this process a base layer is formed on a continuously moving support surface and moved by the surface through printing, laminating and embossing stages wherein a printed design is applied to the base layer, a wear coat is laminated over the design, and the design is embossed. In accordance with the invention, the base layer is adhered to the support surface prior to transfer of the printed design thereto.

23 Claims, 3 Drawing Sheets

METHOD AND APPARATUS FOR THE MANUFACTURE OF PRINTED AND EMBOSSED FLOOR COVERING

BACKGROUND OF THE INVENTION

This invention concerns a printed and embossed material, suitable for use as a floor covering and a method and apparatus for making it in a continuous process. More particularly, it concerns a multilayered material combining a base layer, a printed layer and a wear resistant layer, which is embossed in register with the print.

Reverse printed laminates have been made by laminating separate sheets of calendered base material and a preprinted plastic film. Until recently, in continuous processes the printed designs have been limited to random prints because of the difficulty of maintaining the desired dimensions in the preprinted plastic film, in the laminate and in some cases in the base material. The plastic film tends to stretch when it is being printed and subsequently dried. Since it is necessary to apply tension to the printed film during lamination in order to eliminate trapped air and wrinkles, the printed design can also be distorted during lamination.

Alternatively, tiles can be formed in batch processes with designs that are in register to the cut tile by laminating preprinted plastic sheets of silk screen designs to sheets of a suitable base material. The tiles can then be hand clicked from the sheets. The high cost of such a batch process makes in-register printed tile quite expensive and limits its acceptance.

An additional complication is imposed by the desirability of providing a textured surface by embossing the tile. Because the embossing step can be another cause of distortion, some processes are limited to embossing of a plastic surface layer that is integral with a nonplastic stable substrate such as asbestos or asphalt-saturated felt.

As described in U.S. Pat. Nos. 4,312,686, 4,612,074, and 4,773,959, which are incorporated herein by reference, the distortions which occur during printing and laminating are minimized by printing the design on a stable base, preferably release paper, and then transferring the printed design to a hot plastic web made continuously by an extruder. In the printing stage, the plastic web is simultaneously adhered to a carrier belt which moves the web through the printing, laminating and embossing stages. The carrier web supports the web during these steps to avoid distortion thereof. A stress relieved hot plastic film is then laminated to the printed web to provide a protective wear coat. To emboss in register with the printed design, the laminated product is first aligned by means of registration marks as used for alignment during embossing. As a result, individual tiles are cut automatically in register to the printed and embossed pattern.

Although the methods described in the '686, '074, and '959 patents are commercially successful, process lines using these methods still could be improved. One difficulty that may be encountered in operating a continuous process line using these methods arises when transferring the printed design to the sheet material. As indicated above, at the same time the sheet material is adhered to the carrier belt. Simultaneous printing and adhering of the sheet material sometimes produces back-calendering, or the bunching up of the web material, at the printing stage resulting in smearing and elongation of the design.

SUMMARY OF THE INVENTION

We have devised an improved process suitable for continuously producing tiles in which an embossed design is in register with the tile. The improved process generally follows the steps disclosed in the '686 and '074 patents with the addition, however, of a separate step adhering the plastic web to the carrier belt prior to the printing stage. In accordance with this process, a hot plastic material is formed into a continuous layer or web supported by a continuously moving support belt. A design which is printed on a stable base, preferably release paper, is then transferred to the plastic web. A wear coat is then laminated onto the printed web and this laminate is embossed using a conventional engraved roll having raised sections which are images of the printed design. Distortions in the finished product are minimized by adhering and supporting the plastic web on a belt which is not an integral part of the finished product and by maneuvering the belt to control the plastic web.

In accordance with the present invention, distortions in the printing process are minimized by adhering the plastic web to the carrier belt prior to the printing stage. By adhering the web to the support belt in a separate stage, it is possible to operate the rolls of the printing process at much lower pressures, thereby eliminating any back calendaring at the printing stage and avoiding the distortions in the printed design that are attendant thereto.

BRIEF DESCRIPTION OF THE DRAWINGS

These and other objects, features and advantages of our invention will be more readily apparent from the following detailed description of a preferred embodiment of the invention in which.

DESCRIPTION OF THE PREFERRED EMBODIMENTS

Figure 1:
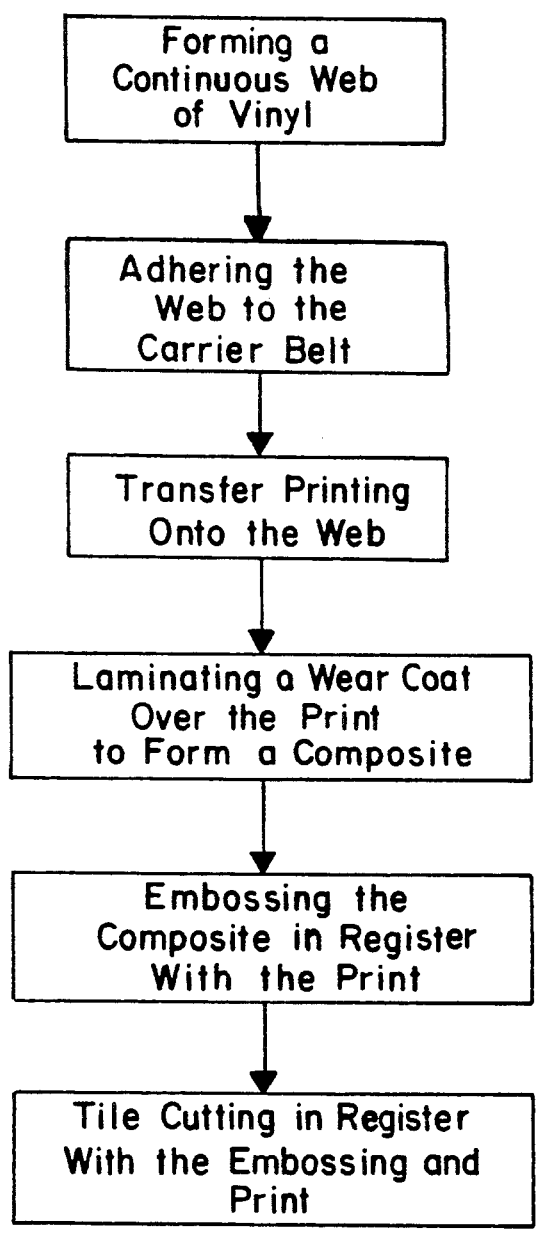
FIG. 1 is a block diagram illustrating the major steps followed in the practice of our invention.
Figure 2:
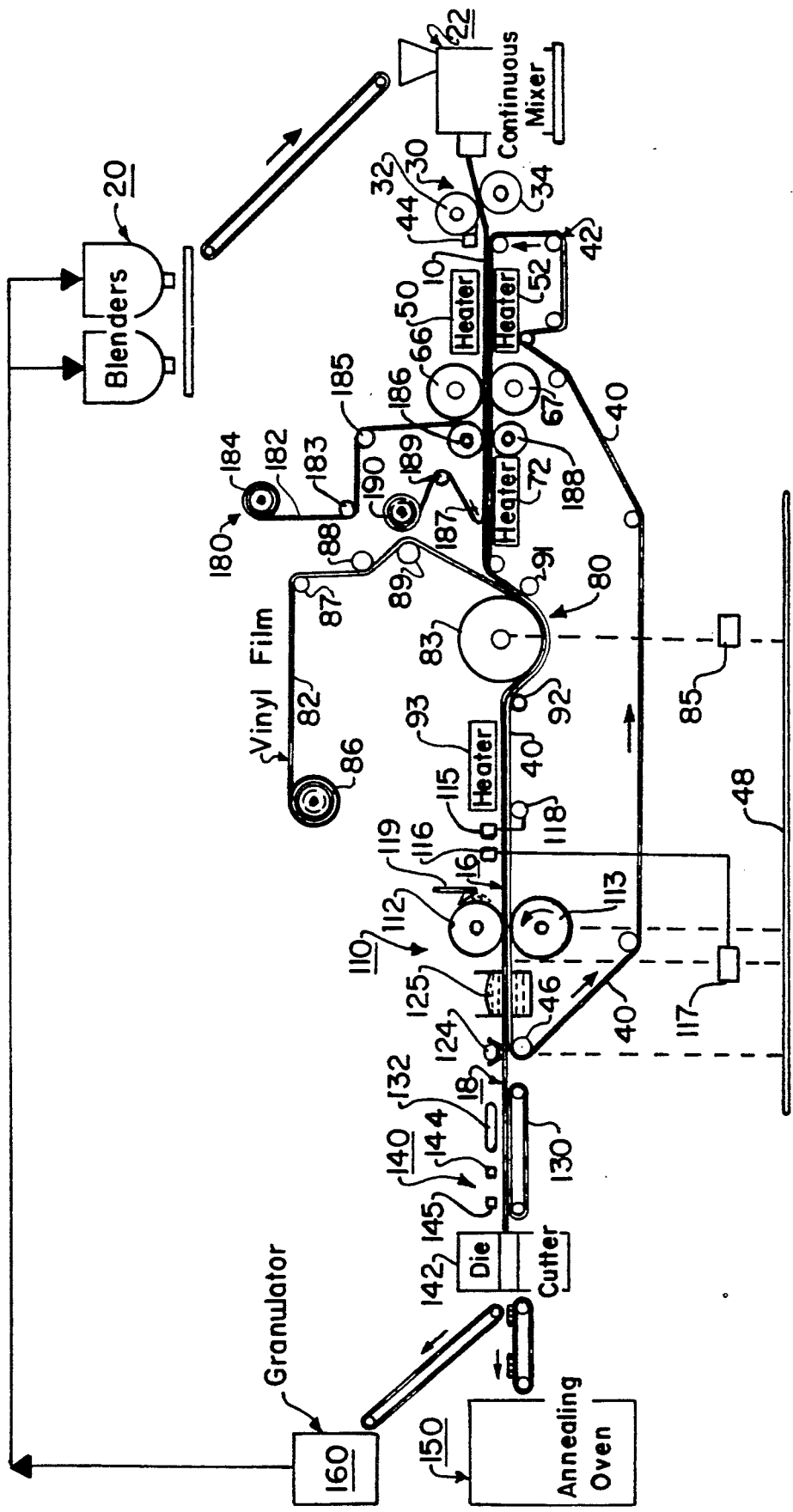
FIG. 2 is a schematic diagram of a preferred embodiment of apparatus used in the practice of our invention.
Figure 7:
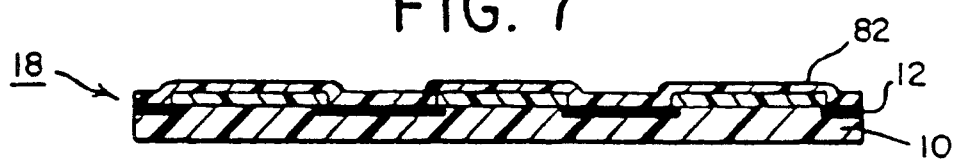
FIG. 7 is a cross-section of the base web, print layer and vinyl film after it has been embossed in register with the print by the embossing roll of FIG. 6.
Figure 8:
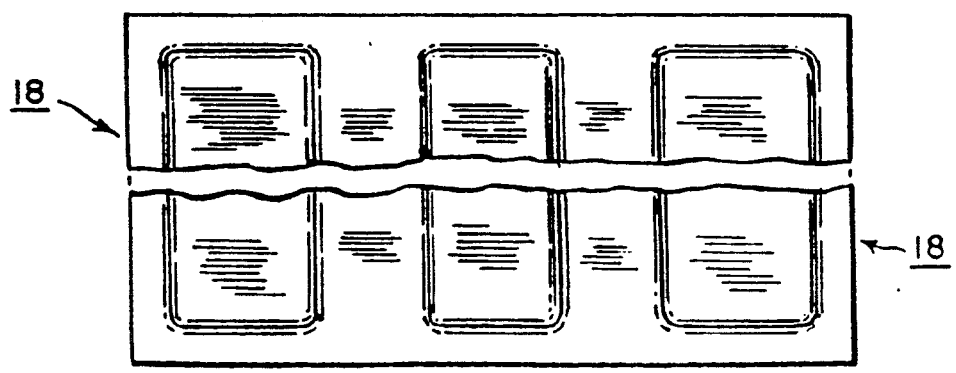
FIG. 8 is a plan view of a tile which has been embossed in register with the print using the embossing roll of FIG. 6.

FIGS. 1 and 2 illustrate a preferred method and apparatus for practicing our invention to make a solid vinyl tile on which a decorative layer of print has been embossed in register with the print. Substantial portions of this method and apparatus are similar to those described in the '686, '074 and '959 patents. Cross-sectional and plan views of the finished tile are shown in FIGS. 7 and 8.

As shown in FIG. 1, the major steps followed in making such a tile comprise: forming a continuous web of vinyl, adhering this web to a carrier belt, transfer printing on the web, laminating a protective wear coat over the print to form a composite, embossing the composite in register with the print, and tile cutting in register with the print. In accordance with the invention, the composite is embossed in register with the print while maintaining proper tension in the web as it is fed into the embossing roll. Preferably, the embossed laminate is partially annealed before cutting; and further annealing is performed on the tiles after they are cut. Infrared heating is used to raise the web and the wear coat to appropriate temperatures for adhering, laminating, and pre-annealing. Final annealing is accomplished in a hot air oven.

The specific temperatures for performing the various step of the process described below will be apparent to those skilled in the art from the teaching of the ,959 patent.

Figure 3:
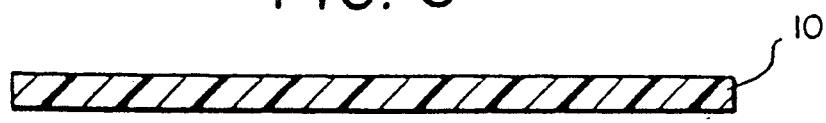
FIG. 3 is a cross-section of a base web used in the practice of our invention.

Specific apparatus for performing the steps of FIG. 1 is shown in FIG. 2. A continuous base web of vinyl is prepared by blending its constituents in blenders 20 and supplying the mix to a continuous mixer 22. Hot plastic from mixer 22 is continuously supplied to a calender 30 comprising a pair of rolls 32, 34 which produces a continuous hot plastic base web 10 having a surface smooth enough to receive a layer of print. As is known in the art, a doctor knife (not shown) may be used to separate base web 10 from the calender rolls. A cross-section of a portion of base web 10 as it leaves the calender rolls is depicted in FIG. 3. The thickness of this cross-section typically ranges from about 30 to 120 mils (0.75 to 3 mm.). The width of this crosssection is about 14 inches (35 cm.) Other dimensions, however, may be used in the practice of the invention.

As described in the '686 patent, hot plastic web 10 flows continuously onto a moving carrier belt 40 which is made of a material such that the web will adhere to the belt when the web is hot, but can be removed from it when the web is cool. Typically, such a carrier belt is made of woven fiberglass impregnated with a silicone elastomer. Carrier belt 40 moves base web 10 through the adhering, printing, laminating and embossing stages, supporting the web during these steps. The belt is driven by a drive roll 46 that is driven by means of a conventional line shaft 48. To avoid distorting the plastic web and the design printed thereon, the web is guided and aligned by adjusting the carrier belt by means of a guidance system 42. Near calender 30, a loop speed sensor 44 is used to control the speed of the carrier belt so that the hot plastic web leaves calender rolls 32, 34 at a constant speed.

As the web moves away from calendar 30, it is heated to the temperature required to adhere the web to the carrier belt. A first infrared heater 50 heats web 10 directly; and a second infrared heater 52 heats carrier belt 40 which, in turn, heats web 10.

Next, the web enters an adhering station 60 where web 10 is adhered to carrier belt 40 prior to the printing stage. As described above, belt 40 is made of a material such that the web will adhere to the belt when hot, but can be removed from the belt when cooled.

The heated web is fed along belt 40 through a second calendar formed by adhering rolls 66, 67 which apply about 80 psi pressure to web 10 and belt 40 as they passed therethrough. As a result, web 10 is pressed and adhered to carrier belt 40. In practicing our invention we have found it useful to cool roll 66 to prevent the roll from sticking to web 10.

Adhering the web to the carrier belt prior to the printing stage eliminates the problem of back-calendering previously associated with that stage. Back-calendering is generally encountered where heavy gauges are passed through rollers. By adhering the web to the carrier belt, the lateral and transverse bunching of the web is eliminated so that the web does not become distorted during the printing stage. As a result, production line throughput is greatly increased and product quality is also improved.

Next, the web enters a transfer printing station 180 that transfers a layer of print from a preprinted release paper 182 to web 10. The print layer can form any kind of design. For high-volume commercial production of tiles the design is preferably one that permits tiles to be cut with the design centered in the tile so that it is in register with the edges of the tile.

Transfer printing station 180 comprises transfer rolls 186, 188, a supply roll 184, a paper guide 183, rollers 185, 189, a strip plate 187 and take up roll 190. The preprinted paper is fed from supply roll 184, through paper guide 183, over roller 185 and through transfer rolls 186, 188. Thereafter, the preprinted paper is wound around an edge of strip plate 187 before passing over roller 189 to takeup roll 190. Since rolls 66, 67 in the previous stage have already adhered the web to the support belt, there is no need to operate, print transfer rolls 186, 188 at comparable pressures; and we have found that satisfactory transfer printing is achieved when the rolls are operated at pressures of about 20 psi. Because a relatively low pressure is exerted by the transfer rolls, it also is not necessary to cool rolls 186, 187.

To ensure proper alignment of the printed paper in a transverse direction, an edge guidance system (not shown) is used. Moreover, to permit splicing of rolls of preprinted paper it is preferable to use conventional splicing equipment (not shown) including an unwind roll stand, a splice table and a compensator that allows time to splice the printed design in register.

Figure 4:
FIG. 4 is a cross-section of a base web after a print layer has been transferred to it in accordance with our invention.

To transfer the layer of print from the release paper, paper 182 passes through paper guide 183 which aligns the preprinted paper with the plastic web. Illustratively, paper guide 183 is a Fife edge guide. Paper 182, web 10 and carrier belt 40 pass through the nip formed by rolls 186, 188; and the paper is then separated from the web by strip plate 187 advantageously positioned at the point of separation of paper 182 from web 10. Takeup roll 190 can be provided with suitable tension control devices. A cross-section of the printed web depicting base web 10 and a print layer 12 is shown in FIG. 4. This cross-section is not to scale because the thickness of the print layer is quite small (0.0025 to 0.025 mm.) compared to the 0.75 to 3 mm. thickness of base web 10.

The printed web is then heated indirectly by an infra red heater 72 that heats the underside of carrier belt 40. The web is next fed into a laminating station 80 where a web 82 of vinyl film is laminated to the printed side of web 10 to provide a protective wear coat. Laminating station 80 comprises a heated rotating drum 83, an upper high intensity infrared heater 93, a web guide 89, a supply roll 86, and rollers 87, 88, 91 and 92. In addition, the station preferably includes conventional splicing equipment (not shown) including an unwind roll stand, a hot splicer and a compensating device which allows time to splice the film.

Drum 83 is driven by line shaft 48 which is coupled to the drum by means of a speed control 85 such as a Specon (Rez. T. M.) speed control manufactured by Fairchild Hiller. As described in the '074 and '959 patents, the speed control 85 regulates the speed of the drum relative to that of the embossing roll and backup roll.

Supply roll 86 provides a continuous web 82 of preformed vinyl film. Typically, the vinyl film is from 3 to 12 mils (0.075 to 0.3 mm) in thickness.

Figure 5:
FIG. 5 is a cross-section of the base web after a vinyl film has been laminated over the print layer.

Web 82 passes through web guide 89 which moves web 82 in a transverse direction so that web 82 is in register with the printed web. Illustratively, web guide 89 is a Fife edge guide. Web 82, the printed web and carrier belt 40 pass through the nip formed by rotating drum 83 and roller 91; and web 82 is pressed and laminated by drum 83 onto the printed web. These webs adhere to carrier belt 40 and strip away from rotating drum 83 at roller 92 and pass on carrier belt 40 under heater 93. Infrared heater 93 heats the vinyl film and, therefore, the printed web. For the films used in the practice of the preferred embodiment of the invention, the temperature of web 82 is raised by infrared heater 93 with the result that the vinyl film is stress relieved and forms a composite 16 in which print layer 12 is located between webs 82 and 10. A cross-section of composite 16 showing vinyl wear coat 82 over print layer 12 is shown in FIG. 5.

Figure 6:
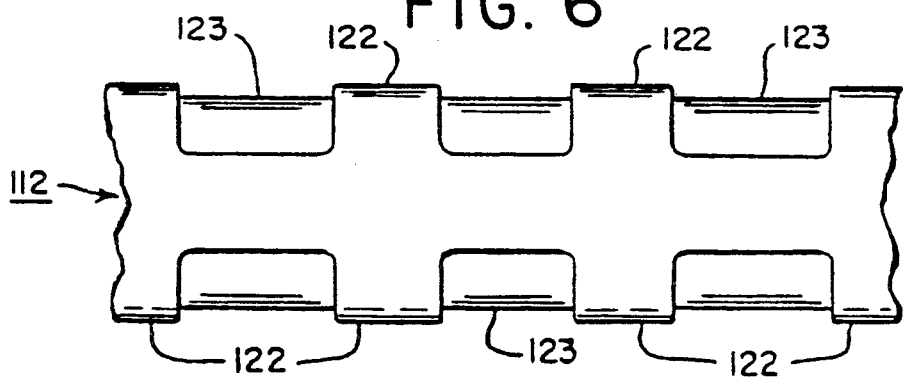
FIG. 6 is a view of an embossing roll used in the practice of our invention.

The carrier belt then moves the composite to an embossing station 110. This station comprises an embossing roll 112, a rubber backup roll 113, and means for transverse and longitudinal positioning of the laminated web. As shown in FIG. 6, embossing roll 112 is an engraved or etched steel or copper roll having areas 122 that are raised above other areas 123 on the roll. Typically the difference in height between areas 122 and 123 averages about 6 to 14 mils (0.15 to 0.35 mm.). Preferably, areas 122 constitute an image of the design that is transfer printed onto the base web. Both the embossing roll and the backup roll are water cooled.

The positioning means includes two electric eyes 115, 116, a speed control means 117 and a positioning roll 118. Backup roll 113 is driven directly by line shaft 48 so that its surface speed is the same as that of drive rolls 46. Embossing roll 112 is also driven by line shaft 48 but its speed is controlled by speed control means 117. The electric eyes sense registration marks which are printed on the web along with the printed design. Electric eye 115 controls positioning roll 118 which guides composite 16 in the transverse direction so that the embossing roll areas 122 are in register with the images on the printed web. Electric eye 116 is connected to speed control 117 and controls the phase of the embossing roll so that embossing roll areas 122 are in register in the longitudinal direction with the printed pattern on the web. Specific apparatus for producing transverse and longitudinal registration with the embossing roll include a Fife photoelectric line control and a Bobst Champlain registron control, respectively. Numerous other devices will be apparent to those skilled in the art.

The outer surface of embossing roll 112 is cooled directly by a water spray 119, and this spray also cools the upper surface of composite 16. Water spray 119 cools and sets composite 16 to such a degree that stretching of composite 16 by rolls 112 and 113 is minimized. Applying water to roll 112 before composite 16 makes contact reduces the likelihood that composite 16 will adhere to roll 112. Composite 16 and belt 40 pass through the nip defined by embossing roll 112 and backup roll 113; and raised areas 122 of the embossing roll form corresponding depressions in the composite. A cross section of an embossed composite 18 as formed by this step is shown in FIG. 7 and a plan view in FIG. 8.

We have found it advantageous to control the surface speed of rotating drum 83 relative to that of embossing roll 112 and backup roll 113 so that the surface speed of drum 83 is about 98 to 99% of that of rolls 112 and 113 and preferably is about 98.2%. Advantageously, this speed relation can be maintained by setting speed control 85 so that its output rotational shaft speed is in the range of 98 to 99% of its input rotational shaft speed which is the same rotational speed as that of line shaft 48. With this speed relationship, we have found that appropriate tension is produced in composite 16 so that the composite does not become distorted either by bunching up, which causes lateral expansion in the direction transverse to the direction of travel of the web, or by stretching in the direction which is the same as the direction of travel of the web. As a result, production line throughput is greatly increased and product quality is also improved.

After passing through the nip formed by rolls 112 and 113, embossed composite 18 is cooled to a low enough temperature that the embossed composite 18 can be stripped from silicone carrier belt 40. Preferably, this cooling operation is accomplished by immersing composite 18 and belt 40 in a water bath 125. This step permits accurate temperature control during all seasons. Excess water is then removed from the web by a high velocity air knife 124; and the embossed web is stripped from carrier belt 40.

At this point the carrier belt 40 reverses direction. The embossed web, however, moves onto a conveyor belt 130 which carries it through a pre-annealing station 132 which partially removes the strains imparted by laminating and embossing. After pre-annealing, the embossed web is cooled. It then enters a tile cutting station 140 where it is aligned and cut into tiles in register with the pattern printed on the web. Tile cutting station 140 comprises a tile cutter 142, electric eyes 144, 145, and equipment responsive to signals from the electric eyes for aligning the web in the transverse and longitudinal directions.

Specific apparatus for aligning embossed composite 18 will be apparent to those skilled in the art from the teaching of Barchi et al.'s U.S. Pat. No. 3,465,384, entitled "Apparatus for Registration of Plastic Web", which is incorporated herein by reference. As disclosed in that patent, a plastic web 6 is fed on a conveyor belt 28 into a tile cutter 36. Photocells 32, 34 are used to maintain the desired transverse position of the plastic web by driving a reversible motor 128 that controls the lateral position of conveyor 28. The photocells sense the lateral position of the plastic web by sensing a continuous longitudinal stripe 92 that is embossed in the plastic web at the same time as a design is embossed in the remainder of the web. In like fashion in the present invention, electric eyes 144, 145 sense registration marks that are printed on the web along with the printed design. Advantageously these registration marks can be the same as those used to align the web at the embossing station. Numerous closed loop feedback systems for control of both lateral and longitudinal position of the web will be apparent.

The tiles are cut so that they are slightly oversize. They are then annealed in an annealing oven 150 to shrink them to their proper size. Finally they are cooled to ambient temperature and packaged for shipment. Scrap from the tile cutting operation is fed to a granulator 160 and returned to blenders 20 for further use.

Suitable formulations for base web 10, release paper 182 and vinyl film 92 are set forth in the above referenced '686 patent. Preferably the base web is formed of a vinyl composition comprising a minor portion of plasticized vinyl chloride polymer, and/or vinyl acetate copolymer, containing at least 80% vinyl chloride, uniformly mixed with a major proportion of mineral filler, said minor portion constituting about 16 to 25% by weight of the composition and said major portion constituting about 75 to 84% by weight of the composition.

As will be apparent, many of the individual pieces of apparatus used in practicing our invention are conventional. Extrusion equipment, heaters, adhering stations, printing stations, laminating stations, embossing stations, die cutting equipment and aligning apparatus are old. However, the combination of this equipment to produce tile that is embossed in register with print on a continuous basis, at a high output rate and yielding a high percentage of usable tile is new.

While the invention has been described in conjunction with specific embodiments, it is evident that numerous alternatives, modifications, and variations will be apparent to those skilled in the art in light of the foregoing description.

What is claimed is:

1. Apparatus for making, on a continuous basis, a composite vinyl tile comprising:
    means for forming a continuous base web on a moving support surface, said web being formed from a vinyl composition, said moving surface being made of a material such that the base web will adhere to the surface when the web is hot but can be removed from it when the web is cooled,
    means for raising the temperature of said web,
    means for adhering said continuous base web to said moving surface, comprising a pair of oppositely rotating adhering rolls forming a calender operating at a first pressure,
    means downstream of said adhering means for transferring a printed design from a preprinted stable carrier sheet to the continuous base web which has been secured to said moving surface by said adhering means, said printed design being formed by a vinyl material compatible with said base web, said printed design including a first portion which constitutes a decorative design for the finished product and a second portion which provides registration indicia from use in the manufacture thereof, said print transfer means operating at a pressure less than said first pressure,
    means for laminating a clear plastic wear layer over the printed design on the base web,
    means for aligning the web, after the base web is laminated, by means of the printed registration indicia so that the web is aligned with an embossing roll in both the direction transverse to the direction of travel of the web and the direction that is the same as the direction of travel of the web,
    means for mechanically embossing the printed side of the base web with depressions in registration with the printed decorative design,
    means for cooling the base web,
    means for stripping the cooled web from the moving surface,
    means for aligning the web by means of the printed registration indicia so that the web is aligned with a cutting tool in both the direction transverse to the direction of travel of the web and the direction that is the same as the direction of travel of the web, and
    means for cutting the base web into tiles so that the decorative design is in register with the edges of the tile.

2. The apparatus of claim 1 further comprising means for cooling the web with water prior to mechanical embossing so that stretching of the web by the embossing roll will not occur.

3. The apparatus of claim 1 further comprising:
    means for pre-annealing the web after it has been stripped from the moving surface, and
    means for cooling the pre-annealed web before it is cut.

4. The apparatus of claim 1 further comprising a rotating drum for applying the wear layer to the base web, the surface speed of said drum being less than that at which the base web is driven through the embossing means.

5. The apparatus of claim 4 wherein the surface speed of the rotating drum is approximately 98 to 99% of that at which the base web is driven.

6. The apparatus of claim 4 wherein the embossing means comprises a backup roll and an embossing roll and the apparatus further comprises a rotating drum for applying the wear layer to the base web, the surface speed of said drum being less than the surface speed of said backup roll.

7. The apparatus of claim 6 wherein the surface speed of the rotating drum is approximately 98 to 99% of the surface speed of the backup roll.

8. The apparatus of claim 1 further comprising means for continuously controlling the speed of the continuously moving base web in the laminating step relative to the speed of the continuously moving base web in the embossing step in order to maintain proper web tension so that the web does not expand laterally in the direction transverse to the direction of travel of the web or stretch in the same direction as the direction of travel of the web.

9. The apparatus of claim 1 further comprising means for cutting the tiles oversized wherein the tiles are shrunken to their proper size during annealing.

10. A method of making, on a continuous basis, a composite vinyl tile comprising the steps of:
    forming a continuous base web on a continuously moving support surface travelling in a substantially horizontal direction, said web being formed from a vinyl composition, said moving surface being made of a material such that the base web will adhere to the surface when the web is hot but can be removed from it when the web is cooled,
    heating said base web,
    adhering said heated continuous base web to said moving surface, said step comprising passing said web and said surface through a calendar operating at a first pressure so that bunching of said the transfer of a printed design will not occur,
    transferring a printed design from a pre-printed stable carrier sheet to a surface of the continuous base web after the base web has been secured to said moving surface, said printed design being formed by a vinyl material compatible with said base web, said printed design including a first portion which constitutes a decorative design for the composite vinyl tile and a second portion which provides registration indicia for use in manufacturing thereof, said print transfer step being carried out at a pressure less than said first pressure, laminating a clear plastic wear layer over the printed design on the base web, after the base web is laminated, aligning the web by means of the printed registration indicia so that the web is aligned with an embossing roll in both a direction transverse to the direction of travel of the web and a direction that is the same as the direction of travel of the web, mechanically embossing the printed surface of the base web with depressions in registration with the printed decorative design, after the base web is embossed, cooling the base stripping the cooled web from the moving surface, after stripping the base web from the moving surface, aligning the web by means of the printed registration indicia so that the web is aligned with a cutting tool in both the direction transverse to the direction of travel of the web and the direction that is the same as the direction of travel of the web, and after aligning the web, cutting the base web into discrete tiles so that the decorative design is in register with the edges of the tiles.

11. The method of claim 10 further comprising the step of cooling the web with water prior to mechanical embossing so that stretching of the web by the embossing roll will not occur.

12. The method of claim 10, further comprising the steps of:

pre-annealing the web after it has been stripped from the moving surface, and cooling the pre-annealed web before it is cut.

13. The method of claim 10 wherein the tiles are cut oversized and are shrunken to their proper size by annealing.

14. The method of claim 10 wherein the wear layer is applied to the base web by a rotating drum whose surface speed it less than that at which the base web is driven during the embossing step.

15. The method of claim 14 wherein the surface speed of the rotating drum is approximately 98 to 99% of that at which the base web is driven during embossing.

16. The method of claim 10 further comprising the step of continuously controlling the speed of the continuously moving base web in the laminating step relative to the speed of the continuously moving base web in the embossing step in order to maintain proper web tension so that the web does not expand laterally in the direction transverse to the direction of travel of the web or stretch in the same direction as the direction of travel of the web.

17. The method of claim 10 wherein said plastic base web is formed from a vinyl composition comprising a minor portion of plasticized vinyl chloride polymer, and/or vinyl acetate copolymer, containing at least 80% vinyl chloride, uniformly mixed with a major proportion of mineral filler, said minor portion constituting about 16 to 25% by weight of the composition and said major portion constituting about 75 to 84% by weight of the composition.

18. The apparatus of claim 1 wherein the means for transferring a printed design from a preprinted stable carrier sheet to the continuous base web comprises a pair of print transfer rolls forming a nip, and wherein the pressure applied by said rotating adhering rolls to said continuous base web and said moving surface as they pass through the calendar formed thereby is higher than the pressure applied by said print transfer rolls to said continuous base web, said preprinted carrier sheet and said moving surface as they pass through the nip formed thereby.

19. The apparatus of claim 18 wherein the ratio of pressure applied by said rotating adhering rolls to the pressure applied by said print transfer rolls is approximately 4:1.

20. The apparatus of claim 19 wherein said rotating adhering rolls apply approximately 80 psi pressure to said continuous base web and said moving surface as they pass through the calendar formed thereby and said print transfer rolls apply approximately 20 psi pressure to said continuous base web, said preprinted carrier sheet and said moving surface as they pass through the nip formed thereby.

21. The method of claim 10, wherein the step of transferring a printed design from a preprinted stable carrier sheet to a surface of the continuous base web comprises passing said web, said carrier sheet and said moving surface through a nip, and wherein the pressure applied by passing said web and said moving surface through said calendar is high than the pressure applied by passing said web, said surface and said carrier sheet through said nip.

22. The method of claim 21 wherein the ratio of pressure applied to said base web and said moving surface by passing them through said calendar to the pressure applied to said web, said carrier sheet and said surface by passing them through said nip is approximately 4:1.

23. The method of claim 22 wherein the pressure applied to said web and said surface by passing them through said calendar is approximately 80 psi and the pressure applied to said web, said carrier sheet and said moving surface as they pass through the nip is approximately 20 psi.

* * * * *